United States Patent
Miyazawa (10) Patent No.: US 10,767,739 B2
(45) Date of Patent: Sep. 8, 2020

(54) TENSIONER

(71) Applicant: TSUBAKIMOTO CHAIN CO., Osaka-shi, Osaka (JP)

(72) Inventor: Toshihiko Miyazawa, Osaka (JP)

(73) Assignee: TSUBAKIMOTO CHAIN CO., Osaka-shi (JP)

( * ) Notice: Subject to any disclaimer, the term of this patent is extended or adjusted under 35 U.S.C. 154(b) by 246 days.

(21) Appl. No.: 16/019,911

(22) Filed: Jun. 27, 2018

(65) Prior Publication Data
US 2019/0011021 A1  Jan. 10, 2019

(30) Foreign Application Priority Data
Jul. 7, 2017 (JP) .................. 2017-133969

(51) Int. Cl.
*F16H 7/08* (2006.01)

(52) U.S. Cl.
CPC ....... *F16H 7/08* (2013.01); *F16H 2007/0806* (2013.01); *F16H 2007/0812* (2013.01); *F16H 2007/0844* (2013.01)

(58) Field of Classification Search
CPC ..... F16H 2007/0806; F16H 2007/0878; F16H 7/08; F16H 7/0848; F16H 2007/0853
USPC ........................................................ 474/110
See application file for complete search history.

(56) References Cited

U.S. PATENT DOCUMENTS

| | | | | |
|---|---|---|---|---|
| 5,259,820 A | * | 11/1993 | Mott | F16H 7/0848 474/110 |
| 5,676,614 A | * | 10/1997 | Inoue | F16H 7/08 474/110 |
| 5,989,139 A | * | 11/1999 | Dusinberre, II | F16H 7/08 474/110 |
| 6,120,402 A | * | 9/2000 | Preston | F16H 7/08 474/109 |

(Continued)

FOREIGN PATENT DOCUMENTS

| | | |
|---|---|---|
| JP | H08-184353 A | 7/1996 |
| JP | 3329609 B2 | 9/2002 |

(Continued)

OTHER PUBLICATIONS

Office Action dated Mar. 25, 2020, issued in counterpart KR application No. 10-2018-0077569, with English translation. (9 pages).

*Primary Examiner* — Henry Y Liu
(74) *Attorney, Agent, or Firm* — Westerman, Hattori, Daniels & Adrian, LLP (57) ABSTRACT

To provide a tensioner that enables, with a simple structure, reduction of installation space of the tensioner and reduction of production costs. The tensioner includes a plunger, a housing, a spring, and a locking mechanism that stops the plunger from projecting out to the front side. The locking mechanism includes a first locking member and a second locking member. The first locking member includes a first spring holder arranged on a first side of a first end of the spring, and a restrained part. The second locking member (Continued)

includes a second spring holder arranged on a second side of a second end of the spring, and a movement restricting part that restricts movement of the restrained part toward the first side. The restrained part and movement restricting part are configured to releasably engage with each other.

7 Claims, 13 Drawing Sheets (56) References Cited

U.S. PATENT DOCUMENTS

| | | | | |
|---|---|---|---|---|
| 6,435,992 | B2* | 8/2002 | Wakabayashi | F16H 7/08 474/101 |
| 6,935,978 | B2* | 8/2005 | Hayakawa | F16H 7/0836 474/109 |
| 7,455,607 | B2* | 11/2008 | Narita | F16H 7/0848 474/101 |
| 7,641,576 | B2* | 1/2010 | Redaelli | F16H 7/08 474/109 |
| 8,888,624 | B2* | 11/2014 | Bauer | F16H 7/08 474/110 |
| 2003/0017893 | A1* | 1/2003 | Kaido | F16H 7/08 474/101 |
| 2006/0229151 | A1* | 10/2006 | Jansen | F16H 7/1281 474/117 |
| 2009/0215564 | A1* | 8/2009 | Pflug | F16H 7/1281 474/135 |
| 2010/0022340 | A1* | 1/2010 | Schmidl | F16H 7/1281 474/135 |
| 2010/0222167 | A1* | 9/2010 | Chekansky | F16H 7/0836 474/110 |
| 2010/0273591 | A1* | 10/2010 | Graf | F16H 7/08 474/138 |
| 2011/0015014 | A1* | 1/2011 | Kroon | F16H 7/08 474/110 |
| 2011/0081997 | A1* | 4/2011 | Markely | F16H 7/0848 474/110 |
| 2011/0230288 | A1* | 9/2011 | Schulz | F16H 7/0848 474/110 |
| 2012/0040790 | A1* | 2/2012 | Perissinotto | F16H 7/08 474/110 |
| 2013/0281238 | A1* | 10/2013 | Kurematsu | F16H 7/08 474/101 |
| 2014/0179471 | A1* | 6/2014 | Markley | F16H 7/0836 474/110 |
| 2014/0364257 | A1* | 12/2014 | Duffy | F16H 7/0848 474/110 |
| 2015/0345596 | A1* | 12/2015 | Lindner | F01L 1/022 474/111 |
| 2015/0354673 | A1* | 12/2015 | Onoda | F16H 7/08 474/110 |
| 2015/0354674 | A1* | 12/2015 | Markley | F16H 7/0848 474/110 |
| 2016/0123436 | A1* | 5/2016 | Takagi | F16H 7/08 474/110 |
| 2016/0252167 | A1* | 9/2016 | Guyot | F16H 7/08 474/111 |
| 2017/0255222 | A1* | 9/2017 | Ullein | F16H 7/08 |

FOREIGN PATENT DOCUMENTS

| | | |
|---|---|---|
| JP | 2003-35343 A | 2/2003 |
| JP | 2004-44749 A | 2/2004 |
| JP | 2006-125506 A | 5/2006 |
| JP | 4527497 B2 | 8/2010 |
| WO | 2013/180145 A1 | 12/2013 |

* cited by examiner

RELATED ART

TENSIONER

BACKGROUND OF THE INVENTION

1. Field of the Invention

The present invention relates to a tensioner that applies appropriate tension to a running chain, belt, or the like.

2. Description of the Related Art

It has been common practice to use a tensioner for maintaining appropriate tension in a chain or the like. For example, a known chain guide mechanism uses a tensioner to bias a tensioner lever for slidably guiding a drive chain, such as an endless roller chain passing over respective sprockets of a crankshaft and a cam shaft inside an engine room, to maintain appropriate tension of the chain or the like.

Figure 10:
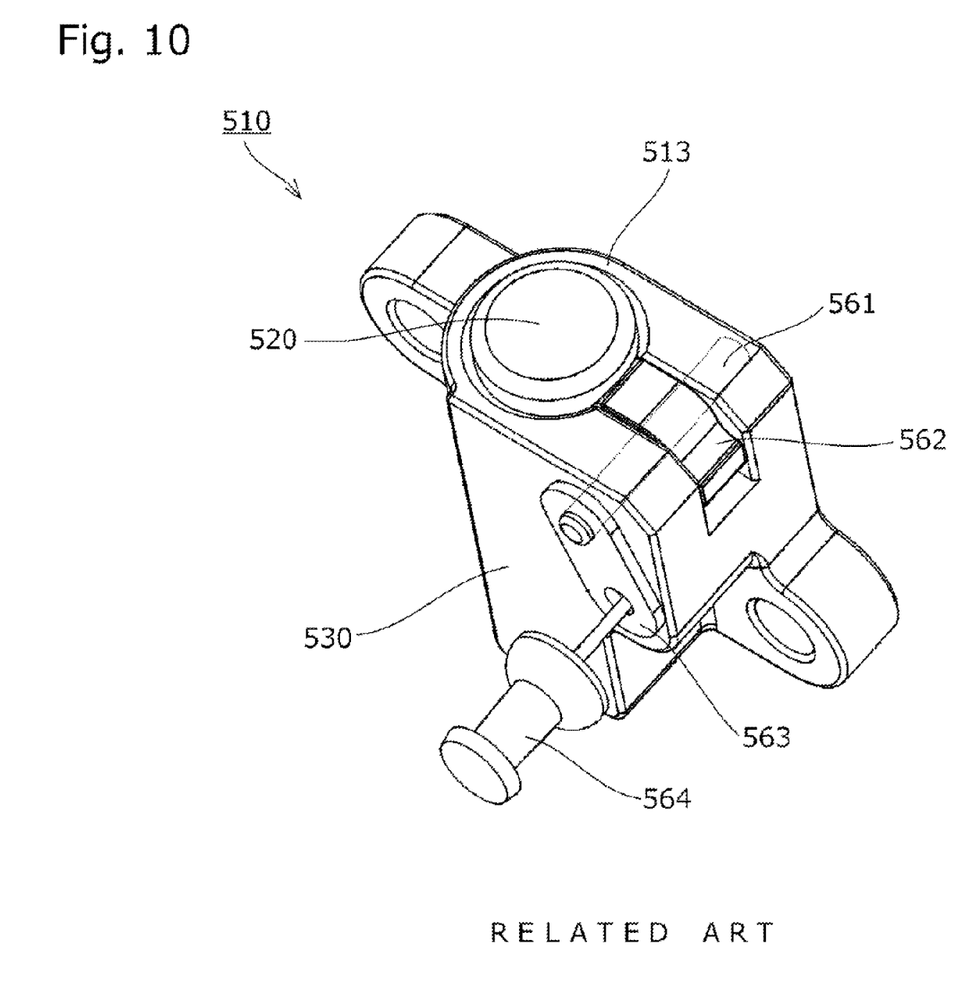
FIG. 10 is a perspective view illustrating a tensioner of related art.

One known tensioner 510 used in such a chain guide mechanism includes, as shown in FIG. 10, a plunger 520 having a plunger hole that is open on the rear side, a housing 530 having a plunger accommodating hole that is open on the front side for accommodating the plunger 520, and a spring accommodated in an oil pressure chamber formed between the plunger 520 and the housing 530 so as to be able to expand and contract and to urge the plunger 520 toward the front side (see, for example, Japanese Patent Application Laid-open No. 2004-44749).

Since it is necessary to prevent the plunger 520 from coining out frontward before it is set to a chain or the like, such tensioner 510 requires a locking mechanism that stops the plunger 520 from coming out frontward.

A locking mechanism that is pivotably attached to the housing 530 via a ratchet pin 561 supported on the housing 530, as shown in FIG. 10, has been widely used. The locking mechanism includes a ratchet 562 that can engage with the plunger 520, a stopper lever 563 fixed to one end of the ratchet pin 561, and a stopper pin 564 extending through the stopper lever 563 and housing 530 for stopping rotation of the stopper lever 563 thereby to stop rotation of the ratchet 562.

Figure 11:
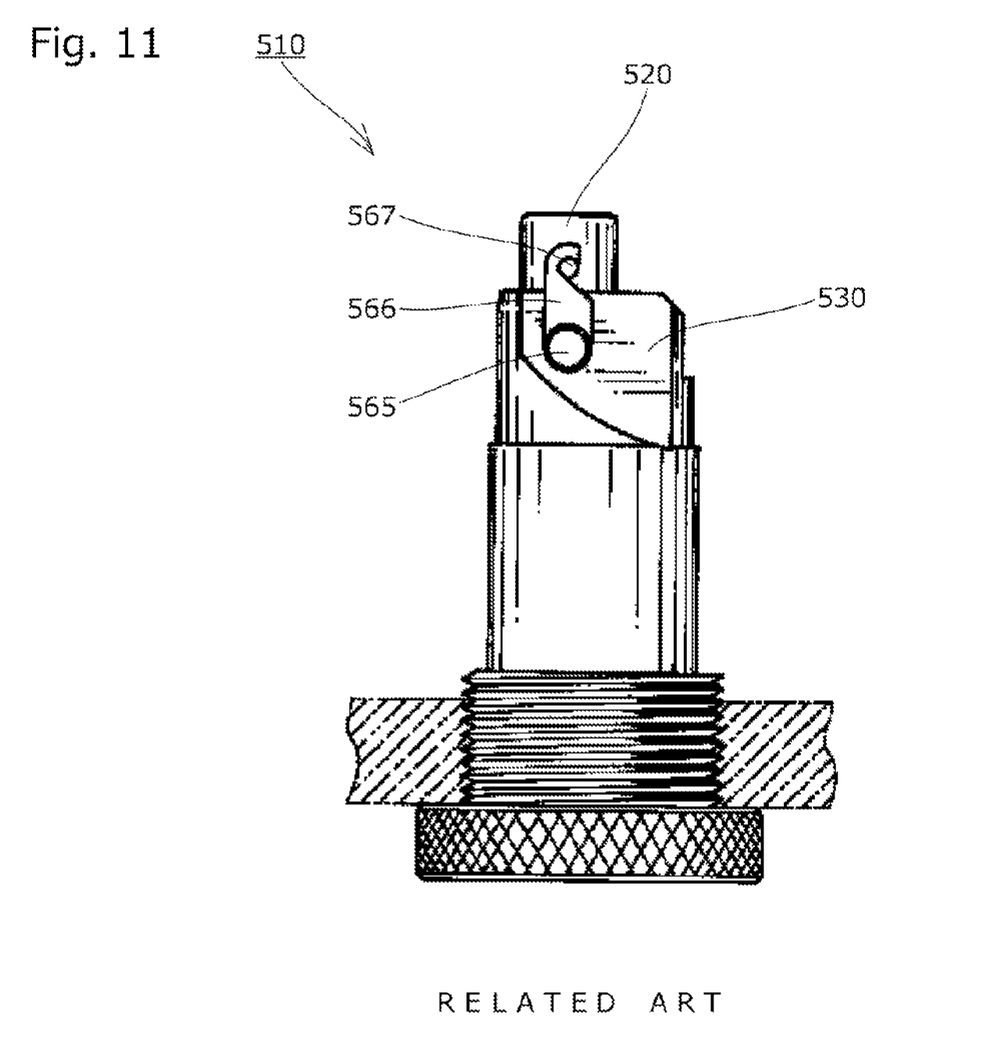
FIG. 11 is an illustrative diagram showing another tensioner of related art.

Another example of a locking mechanism has a plunger stopper hook 566 pivotably supported on a pivot pin 565 that is fixed to the housing 530, and engaged with a locking pin 567 fixed to the plunger 520, as shown in FIG. 11 for stopping the plunger 520 from coming out frontward (see, for example, Japanese Patent Application Laid-open No. 2003-35343).

SUMMARY OF THE INVENTION

One problem with the tensioners shown in FIG. 10 and FIG. 11 is that these tensioners 510 need a sufficient installation space for avoiding interference with surrounding components of the engine block or front case, since the constituent elements of the locking mechanisms are disposed outside the housing.

Another problem with the tensioners shown in FIG. 10 and FIG. 11 is that the plunger and housing require processing such as fixing additional parts and the like, which leads to an increase in the production cost of the tensioner.

The present invention solves these problems and it is an object of the invention to provide a tensioner that enables, with a simple structure, reduction of the installation space for the tensioner and reduction of production costs.

The present invention solves the problems above by providing a tensioner including: a plunger having a plunger hole that is open on a rear side; a housing having a plunger accommodating hole that is open on a front side and accommodates the plunger; a spring accommodated inside an oil pressure chamber formed between the plunger and the plunger accommodating hole so as to be able to expand and contract and to urge the plunger toward the front side; and a locking mechanism stopping the plunger from projecting out toward the front side. The spring includes a first end arranged on a first side in a front-to-back direction and a second end arranged on a second side in the front-to-back direction. The locking mechanism includes a first locking member and a second locking member. The first locking member includes a first spring holder arranged on the first side of the first end of the spring, and a restrained part. The second locking member includes a second, spring holder arranged on the second side of the second end of the spring, and a movement restricting part that restricts movement of the restrained part toward the first side. The restrained part and the movement restricting part are configured to releasably engage with each other.

According to one aspect of the present invention, the first locking member includes a first spring holder arranged on the first side of the first end of the spring, and a restrained part. The second locking member includes a second spring holder arranged on the second side of the second end of the spring, and a movement restricting part that restricts movement of the restrained part toward the first side. The restrained part and the movement restricting part are configured to releasably engage with each other, hence the first locking member and second locking member are set inside the oil pressure chamber and need not foe provided outside the tensioner, therefore interference between surrounding components of the engine block or the like and the locking members can be avoided, so that the installation space for the tensioner can be reduced.

Since the first locking member and second locking member are set inside the oil pressure chamber, no processing is required for the plunger and housing, so that an increase in the production cost of the tensioner can be avoided.

After the first locking member and second locking member are attached to the spring, they can be handled as one unit. This enables the structure of the assembling facility of the tensioner to be simplified, and reduces the costs associated with the assembling of the tensioner.

Since the first locking member and second locking member are set inside the oil pressure chamber, the volume inside the oil pressure chamber is reduced, which makes it possible to maintain the high pressure state in the oil pressure chamber with less amount of oil.

According to another aspect of the present invention, the second locking member includes a release cam formed on the second side opposite the movement restricting part. This release cam is formed to guide the restrained part in the circumferential direction to an open position where the restrained part is not locked by the movement restricting part, when the first locking member and second locking member are moved closer to each other. By moving the plunger rearward, the first locking member and second locking member can foe moved closer to each other so as to disengage the restrained part from the movement restricting part. The plunger is therefore released from the lock simply by using the fact that the plunger is pushed rearward by the tensioner lever or the like when the tensioner is installed. Also, the failure to unlock the plunger can be prevented.

According to another aspect of the present invention, the movement restricting part has a cam profile for guiding the restrained part to a restriction where movement of the restrained part, is restricted by the movement restricting part, when the first locking member and second locking member are moved away from each other. When the first locking member and second locking member are attached to the spring, the first locking member and second locking member are moved closer to each other to cause the restrained part to engage with the movement restricting part, with the spring being sandwiched between the first spring holder and second spring holder. The compressed spring is released from the load later so that the first locking member and second locking member are moved away from each other by the force of the spring. Thus the restrained part can be reliably set to the restriction position with a simple operation.

According to another aspect of the present invention, the restrained part and movement restricting part are disposed radially inside the spring. The first locking member and second locking member can thus be disposed by utilizing the space inside the spring. This way, an increase in the size of the oil pressure chamber can be avoided while a large diameter of the spring is ensured.

According to another aspect of the present invention, the first locking member includes a pin portion having the restrained part formed thereon. The second locking member includes a tubular part having the movement restricting part formed thereto. The pin portion is inserted in the tubular part. This simple structure can maintain the orientation of the first locking member and second locking member relative to each other favorably.

According to another aspect of the present invention, the movement restricting part and release cam are formed by a slit in the tubular part of the second locking member. The movement of the restrained part and of the first locking member can thus be controlled favorably and reliably with a simple structure.

According to another aspect of the present invention, at least a part of a check valve unit is accommodated in the tubular part on the second side thereof, so that the check valve unit can also be handled with the spring, first locking member, and second locking member as one unit. The costs associated with the assembling of the tensioner can thereby be reduced.

DESCRIPTION OF THE PREFERRED EMBODIMENTS

A tensioner 10 according to a first embodiment of the present invention will be described below with reference to the drawings.

Figure 1:
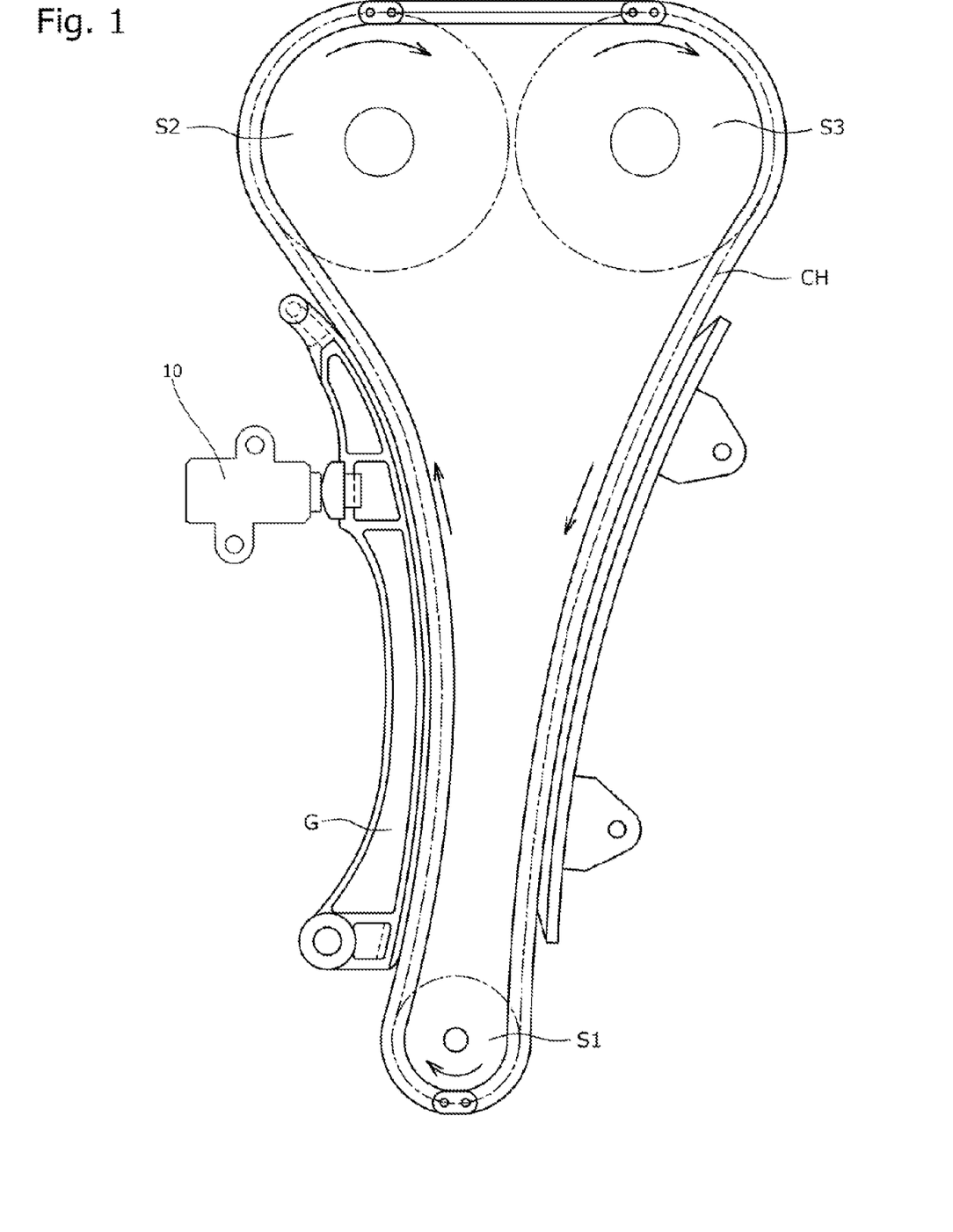
FIG. 1 is an illustrative diagram illustrating a timing system in which a tensioner according to a first embodiment of the present invention is incorporated.

First, the tensioner 10 is incorporated in a chain transmission used in a timing system or the like of a car engine. As shown in FIG. 1, the tensioner is attached to an engine block (not shown) to apply appropriate tension to the slack side of a drive chain CH passing over a plurality of sprockets S1 to S3 via a tensioner lever G to reduce vibration during the drive.

Figure 2:
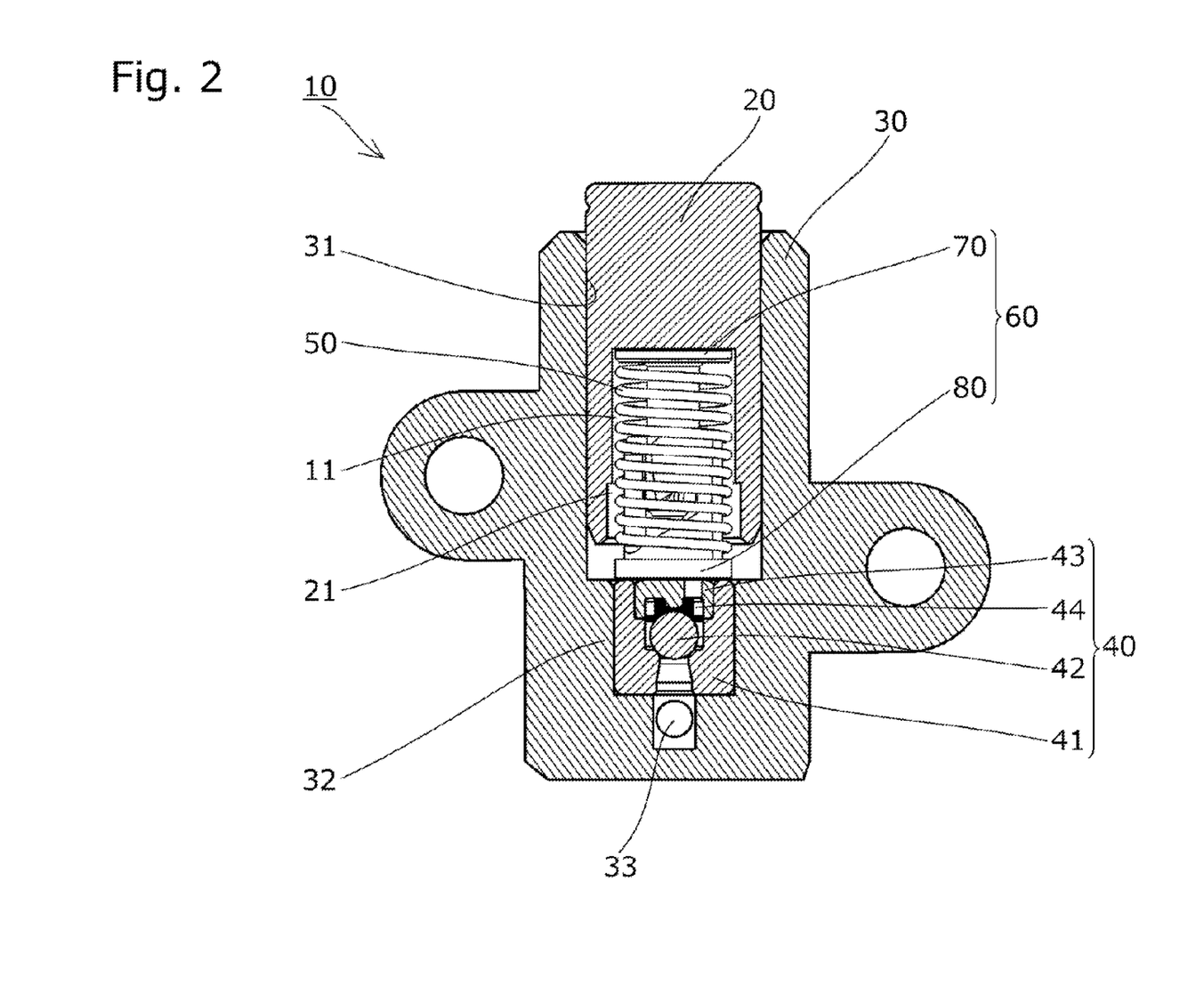
FIG. 2 is an illustrative diagram showing the tensioner.

The tensioner 10 includes, as shown in FIG. 2, a plunger 20 having a plunger hole 21 that is open on a rear side, a housing 30 having a plunger accommodating hole 31 that is open on a front side and accommodates the plunger 20, a check valve unit 40 disposed on a bottom part 32 side of the housing 30, a spring 50 in the form of a coil spring accommodated inside an oil pressure chamber 11 that is formed between the plunger 20 and the plunger accommodating hole 31 so as to be able to expand and contract and to urge the plunger 20 toward the front side, and a locking mechanism 60 that temporarily stops the plunger 20 from projecting out toward the front side.

Hereinafter, various constituent elements of the tensioner 10 will be described with reference to the drawings.

The plunger 20 is made of metal such as iron or the like in the form of a cylinder with a bottom and inserted in the plunger accommodating hole 31 so as to be able to move back and forth in the front-to-back direction, as shown in FIG. 2.

The housing 30 is made of aluminum alloy or synthetic resin and the like, and includes, as shown in FIG. 2, the cylindrical plunger accommodating hole 31 that is open on the front side, a bottom part 32 formed on the rear side, and an oil supply hole 33 formed in the bottom part 32 to extend through an outer wall, of the housing 30 all the way into the plunger accommodating hole 31.

The check valve unit 40 allows the oil to flow into the oil pressure chamber 11 from the outside through the oil supply hole 33, and prevents the oil from flowing out from the oil supply hole 33.

The check valve unit 40 is made up of a ball seat 41, a spherical check ball 42 that can be seated on the ball seat 41 in tight contact therewith, a retainer 43 arranged on the front side of the check ball 42 to restrict the movement of the check ball 42, and a ball spring 44 that urges the check ball 42 toward the ball seat 41, as shown in FIG. 2. The ball spring 44 may not necessarily be provided.

The spring 50 has one end arranged on the rear side of the bottom of the plunger hole 21 (a front-side part of the plunger 20) and the other end arranged on the front side of the check valve unit 40 (retainer 43) as shown in FIG. 2. The spring 50 has a first end 51 arranged on a first side in the front-to-back direction (front side in this embodiment) and a second end 52 arranged on a second side in the front-to-back direction (rear side in this embodiment).

Figure 3:
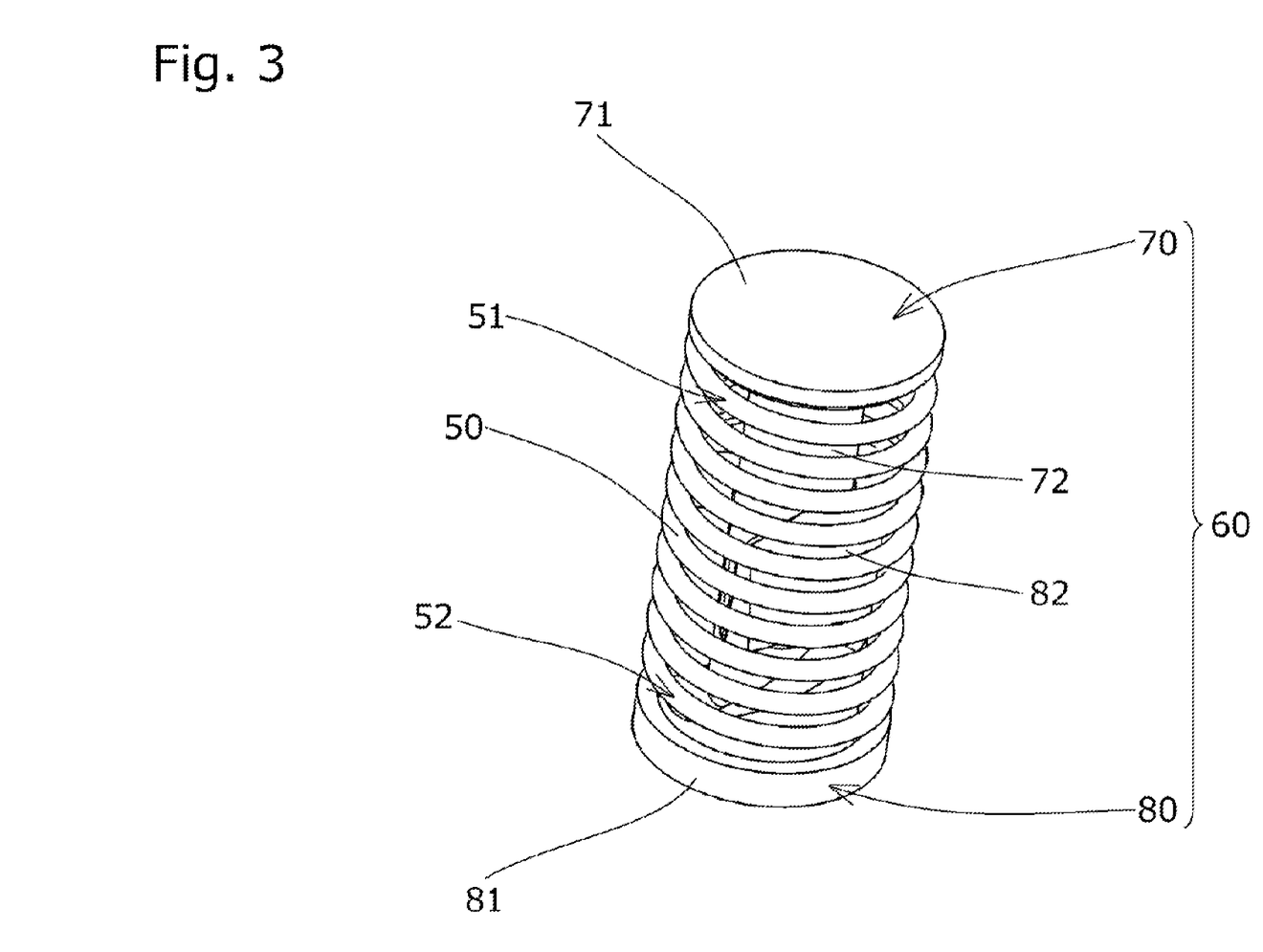
FIG. 3 is a perspective view illustrating a spring and a locking mechanism.
Figure 4:
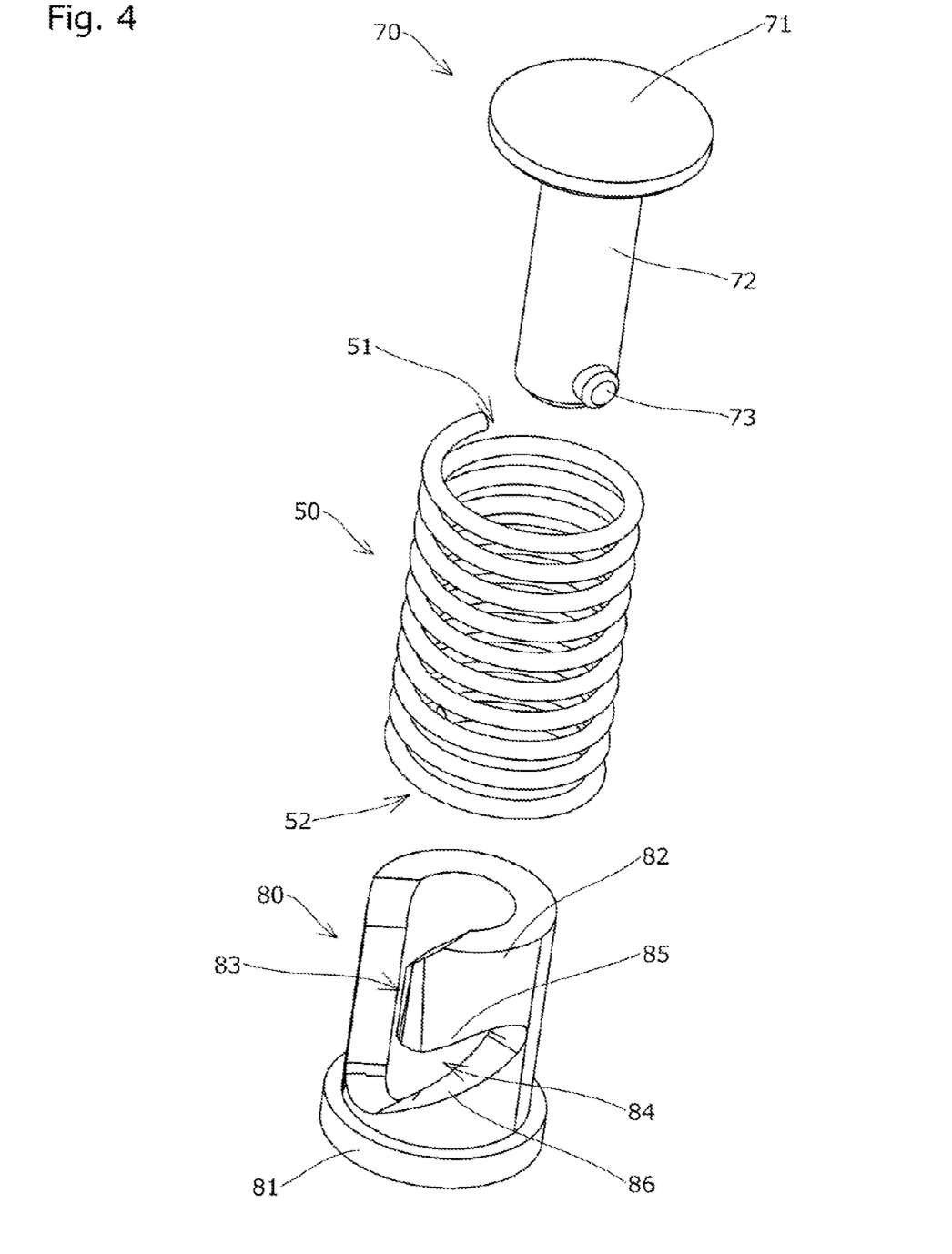
FIG. 4 is an exploded perspective view illustrating the spring and locking mechanism.

The locking mechanism 60 is configured to temporarily stop the plunger 20 from protruding to the front side by keeping the spring 50 compressed in the front-to-back direction. As shown in FIG. 2 to FIG. 4, the locking mechanism is composed of a first locking member 70 and a second locking member 80 made of synthetic resin or metal and the like.

The first locking member 70 integrally includes, as shown in FIG. 2 to FIG. 4, a disc-like first spring holder 71 disposed on the first side (front side in this embodiment) of the first end 51 of the spring 50, a columnar pin portion 72 extending from the first spring holder 71 toward the second side, and a columnar restrained part 73 formed as a boss on an outer circumferential surface of the pin portion 72.

The first spring holder 71 is disposed in contact with the bottom of the plunger hole 21.

The second locking member 80 integrally includes, as shown in FIG. 2 to FIG. 4, an annular second spring holder 81 disposed on the second side (rear side in this embodiment) of the second end 52 of the spring 50, and a cylindrical tubular part 82 extending from the second spring holder 81 toward the first side.

The second spring holder 81 is disposed in contact with the check valve unit 40 (retainer 43). The second spring holder 81 extends radially more outward than the outer circumferential surface of the tubular part 82.

A hole extending through in the front-to-back direction (not shown) is formed in the center of the second spring holder 81, so that oil supplied from outside of the housing 30 via the oil supply hole 33 and check valve unit 40 is supplied into the oil pressure chamber 11 through this hole and a hollow part of the tabular part 82.

The tubular part 82 is formed with a passage slit 83 extending from an edge on the first side of the tubular part 82 toward the second side along the front-to-back direction, and a movement restricting slit 84 formed continuously with the passage slit 83, as shown in FIG. 4.

The passage slit 83 extends through between the outer circumferential surface and the inner circumferential surface of the tubular part 82, with a predetermined width for allowing the restrained part 73 to pass, as shown in FIG. 4. A portion on the first side of the passage slit 83 has a tapered shape such that the width is increased toward the first side.

The movement restricting slit 84 extends from the end on the second side (rear side) of the passage slit 83 diagonally relative to the circumferential and front-to-back directions toward the first side (front side) and away from the passage slit 83, as shown in FIG. 4.

The movement restricting slit 84 extends through between the outer circumferential surface and the inner circumferential surface of the tubular part 82, with a predetermined width for allowing the restrained part 73 to pass and be received.

An inner edge on the first side of the movement restricting slit 84 functions as a movement restricting part 85 that restricts the movement of the restrained part 73 of the first locking member 70 toward the first side, as shown in FIG. 4.

This movement restricting part 85 has a cam profile for guiding the restrained part 73 to a restriction position where the movement of the restrained part is restricted by the movement restricting part 85, when the first locking member 70 and second locking member 80 are moved away from each other.

More specifically, the movement restricting part 85, which extends diagonally relative to the circumferential and front-to-back directions toward the first side (front side) and away from the passage slit 83 as shown in FIG. 4, is configured to guide the restrained part 73 to the restriction position at the end of the movement restricting slit 84, when the first locking member 70 and second locking member 80 are moved away from each other by the force of the spring 50.

The restrained part 73 and movement restricting part 85 are thus configured to releasably engage with each other.

An inner edge on the second side of the movement restricting slit 84 opposite the movement restricting part 85 in the front-to-back direction functions as a release cam 86.

This release cam 86 is formed to guide the restrained part 73 in the circumferential direction to an open position where the restrained part is not locked by the movement restricting part 85, when the first locking member 70 and second locking member SO are moved closer to each other.

More specifically, the release cam 86, which extends diagonally relative, to the circumferential and front-to-back directions toward the first side (front side) and away from the passage slit 83, is configured to guide the restrained part 73 to the open position that is an end position on the second side of the passage slit 83, when the first locking member 70 and second locking member 80 are moved closer to each other.

Next, the process of attaching the first locking member 70 and second locking member 80 to the spring 50 will be described below.

Figure 5A:
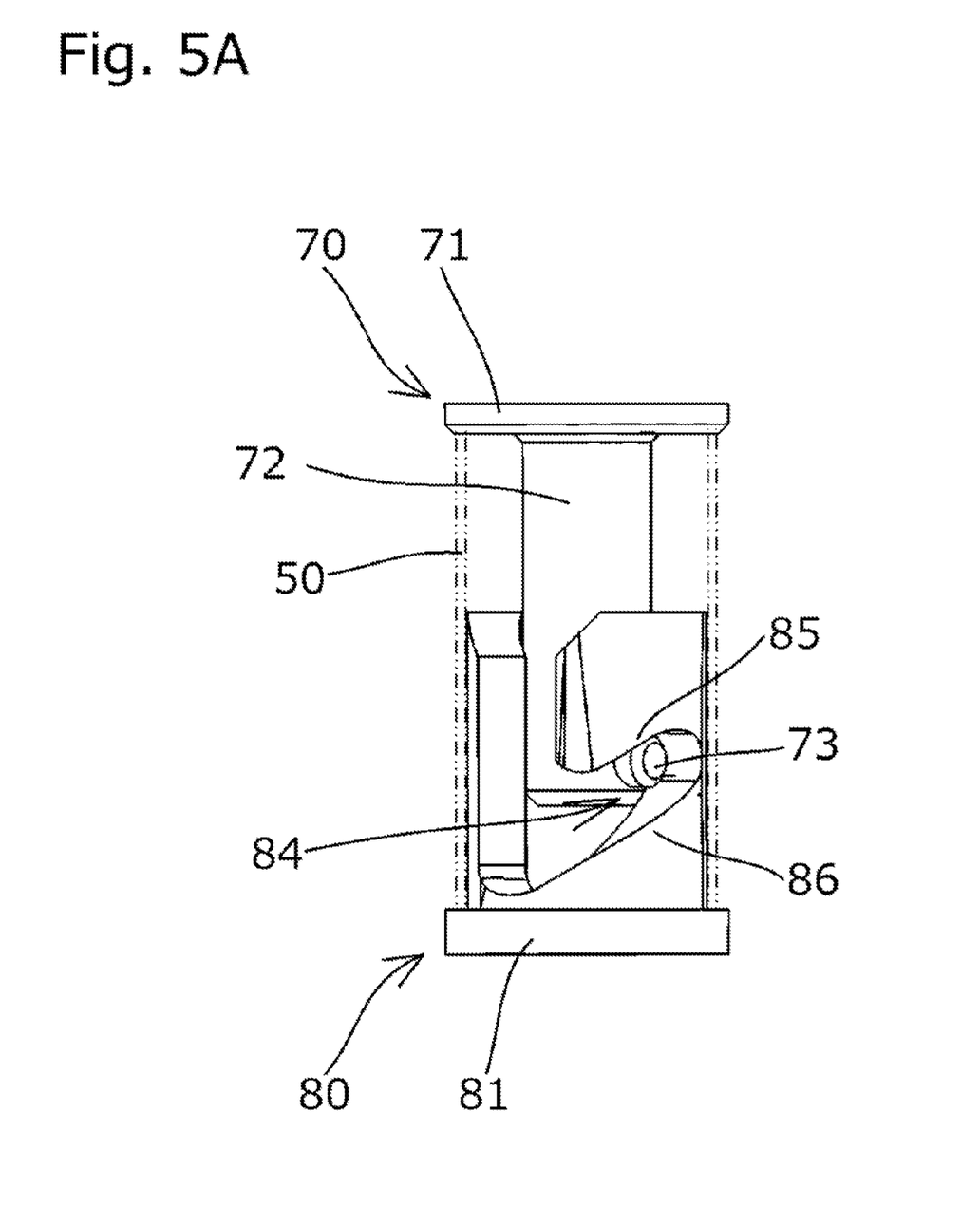
FIG. 5A to FIG. 5C are diagrams illustrating how the locking mechanism works.
Figure 5B:
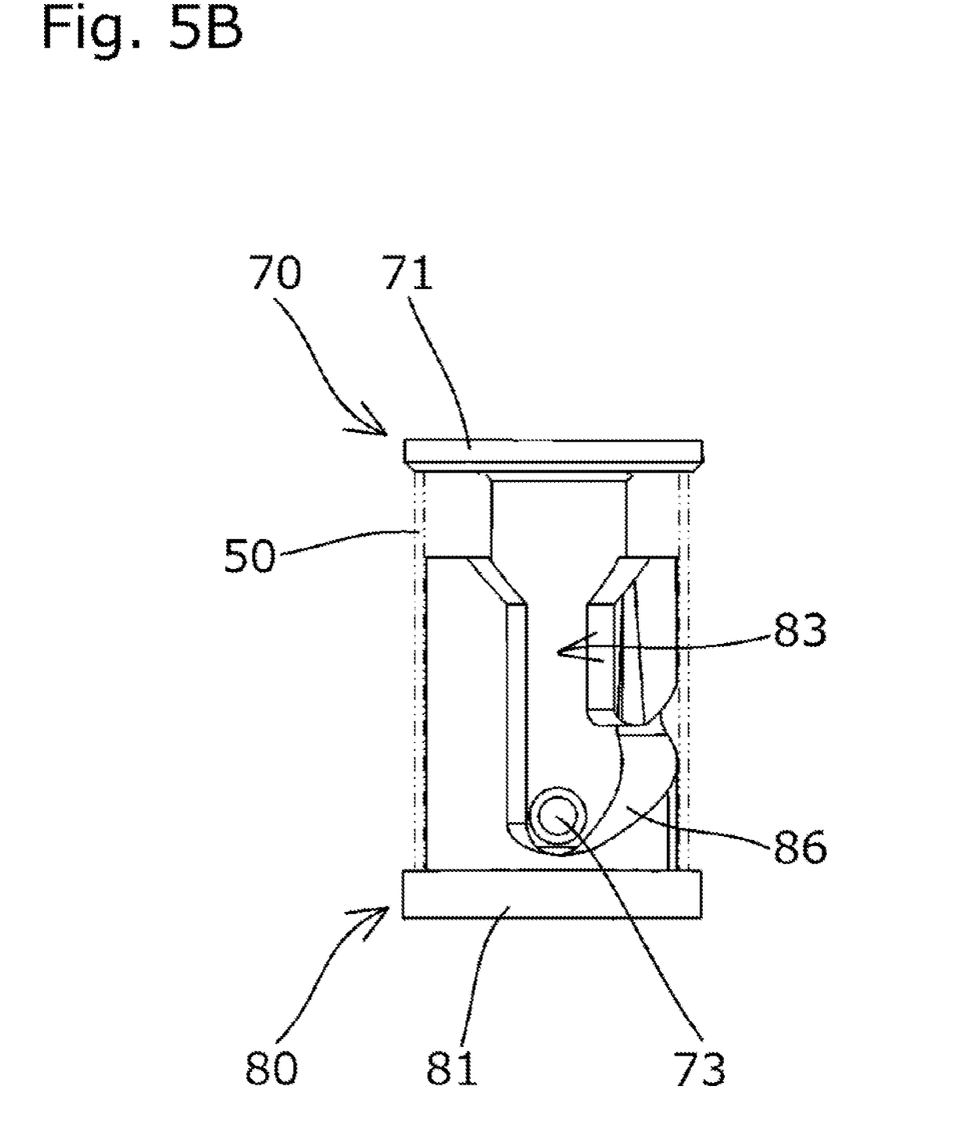
Figure 5C:
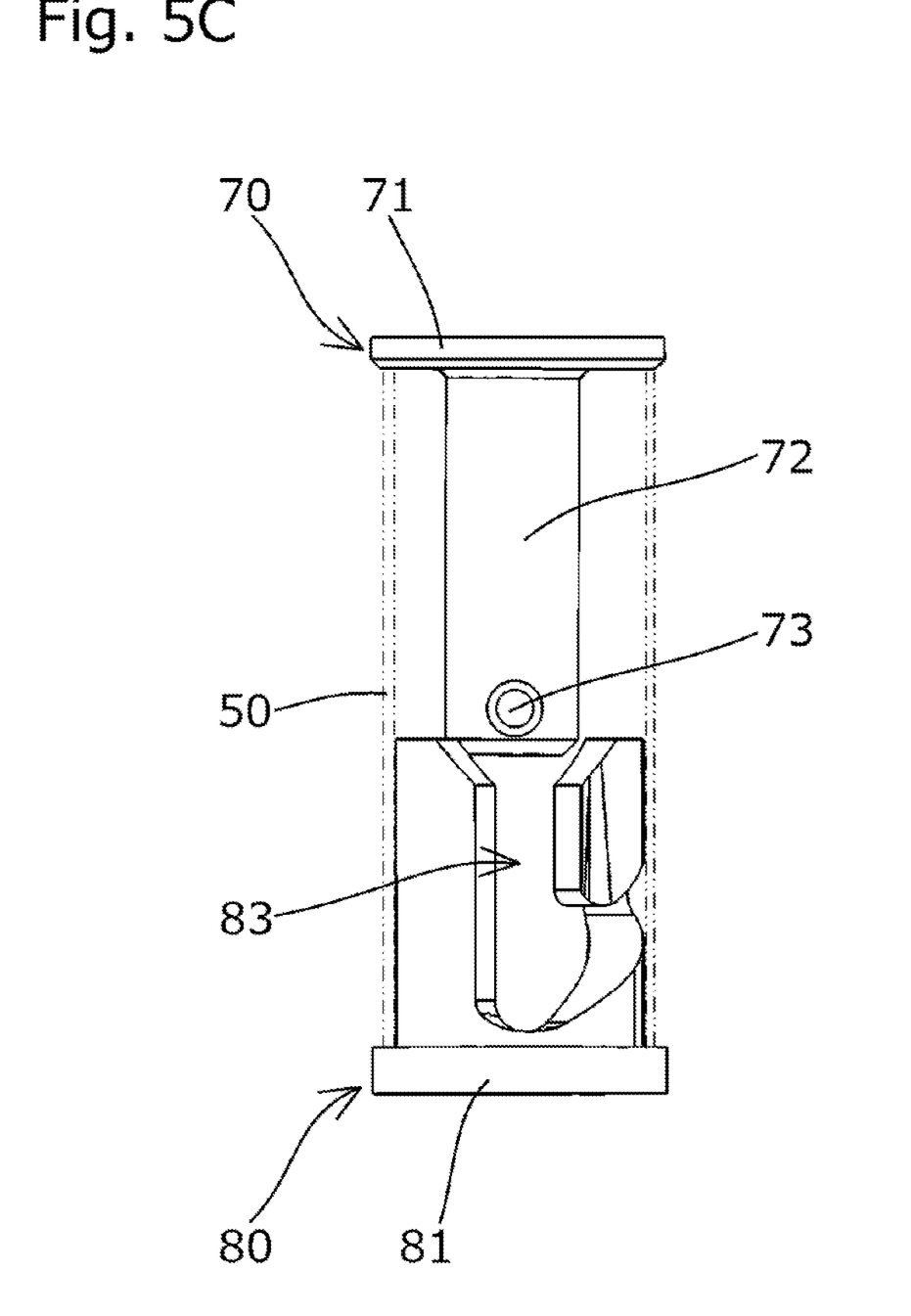
Figure 6:
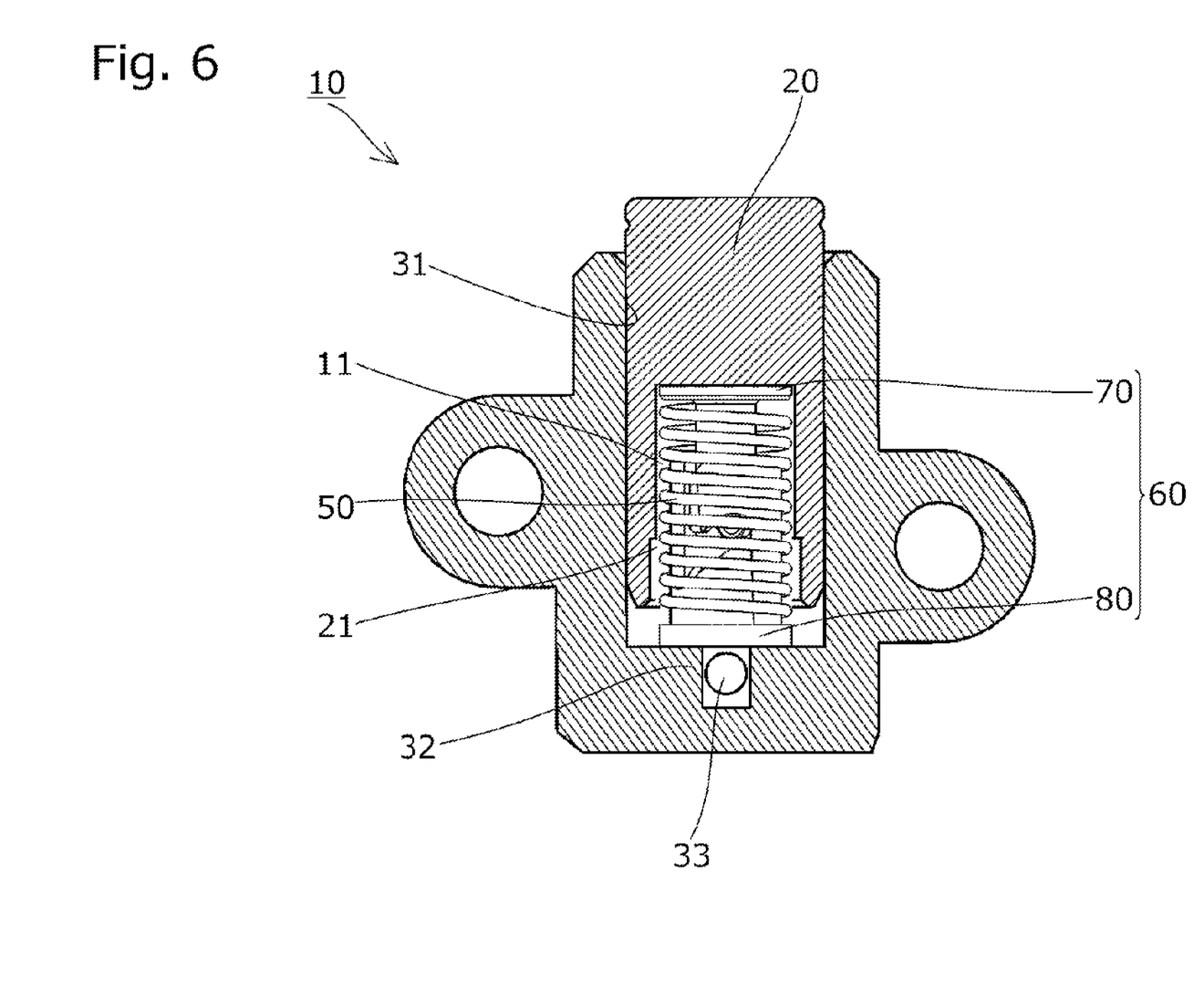
FIG. 6 is a cross-sectional view illustrating a tensioner according to a second embodiment of the present invention.
Figure 7:
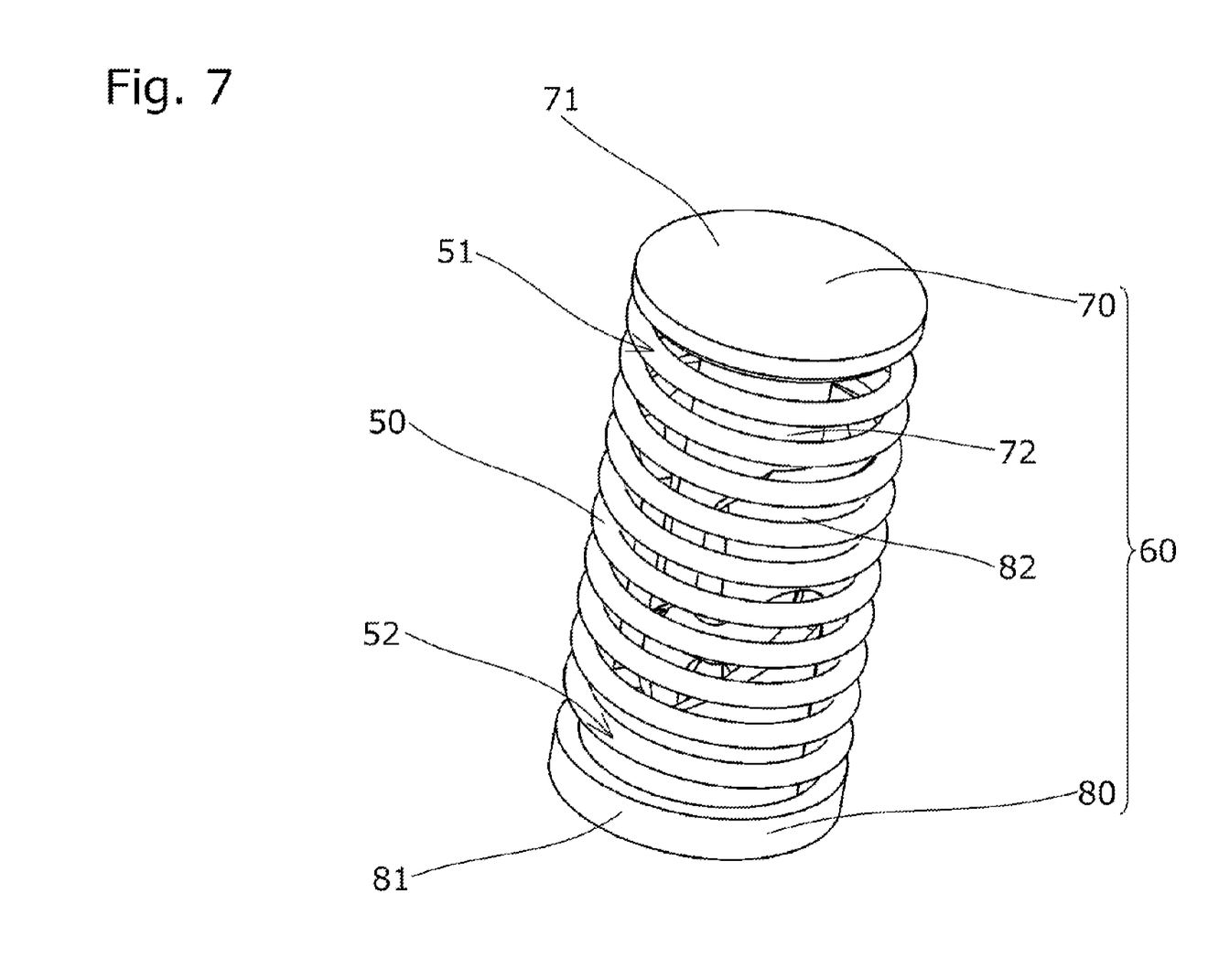
FIG. 7 is a perspective view illustrating a spring and a locking mechanism.

First, as shown in FIG. 5C, the tubular part 82 of the second locking member 80 is inserted into the spring 50 from the second end 52 side, and the pin portion 72 of the first locking member 70 is inserted into the spring 50 from the first end 51 side.

Next, with the spring 50 being sandwiched between the first spring holder 71 of the first locking member 70 and the second spring holder 81 of the second locking member 80, the first locking member 70 and second locking member 80 are moved closer to each other in the front-to-back direction to compress the spring 50, and the pin portion 72 is inserted into the tubular part 82 from the first side, with the restrained part 73 being positioned inside the passage slit 83.

Next, as shown in FIG. 5B, after the first spring holder 71 and second spring holder 81 have been moved closer to each other until the restrained part 73 comes near the end on the second side, of the passage slit 83, the first locking member 70 and second locking member 80 are rotated relative to each other so that the restrained part 73 is positioned inside the movement restricting slit 84.

When the load on the compressed spring 50 is removed, the spring 50 resiliently restores and expands to cause the first locking member 70 and second locking member 80 to move away from each other, and the restrained part 73 is guided by the movement restricting part 85 to the restriction position at the end of the movement restricting slit 84 as shown in FIG. 5A. At this time, the first locking member 70 and second locking member 80 rotate relative to each other.

After that, the engagement between the restrained part 73 and the movement restricting part 85 retains the first locking member 70 and second locking member 80 at their positions relative to each other in the front-to-hack direction so that the spring 50 is kept compressed, and thus the spring 50, first locking member 70, and second locking member 80 can be handled as one unit.

Next, how to unlock the locking mechanism 60 that stops the plunger 20 from protruding out will be described below.

First, as shown in FIG. 5A, with the compressed spring 50, first locking member 70, and second locking member 80 assembled together as one unit being disposed inside the oil pressure chamber 11, the tensioner 10 is installed to a predetermined position as shown in FIG. 1.

When installed, the plunger 20 is pushed rearward by the tensioner lever G, which causes the first locking member 70 and second locking member 80 to approach each other, so that the restrained part 73 is guided by the release cam 86 to the open position that is the end position on the second side of the passage slit 33. In other words, the restrained part 73 and movement restricting part 85 are disengaged from each other by themselves. At this time, the first locking member 70 and second locking member 80 rotate relative to each other.

Next, when the plunger 20 is stopped from being pressed rearward, the spring 50 resiliently restores and expands, and the plunger 20 is pushed by the plunger 20 to protrude forward.

When the spring 50 expands, the first spring holder 71 (first locking member 70) may be subjected to a rotational force from the first end 51 of the spring 50 (which acts clockwise when viewed from above, when the spring 50 is left-handed as in this embodiment). The movement restricting slit 84 is positioned relative to the passage slit 83 such that the restrained part 73 will not enter the movement restricting slit 84 again by this rotational force applied to the first locking member 70 (the movement restricting slit 84 is behind the passage slit 83 in the clockwise direction when viewed from above, in this embodiment).

Next, a tensioner 10 according to a second embodiment of the present invention will be described with reference to FIG. 6 to FIG. 9. The second embodiment is, in part, exactly the same as the previously described first embodiment, and therefore the description of its configurations other than the differences will be omitted.

Figure 8:
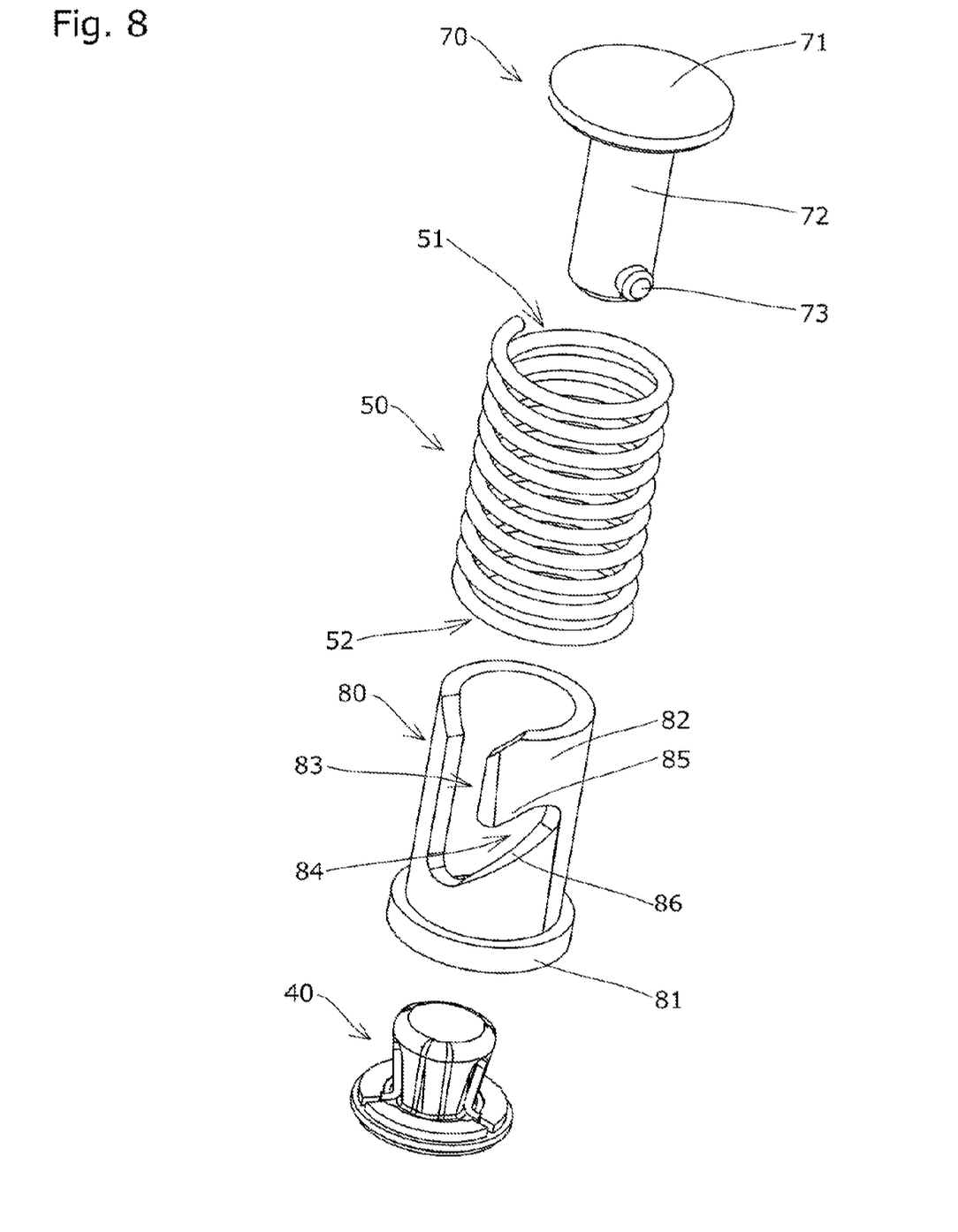
FIG. 8 is an exploded perspective view illustrating the spring and locking mechanism.
Figure 9:
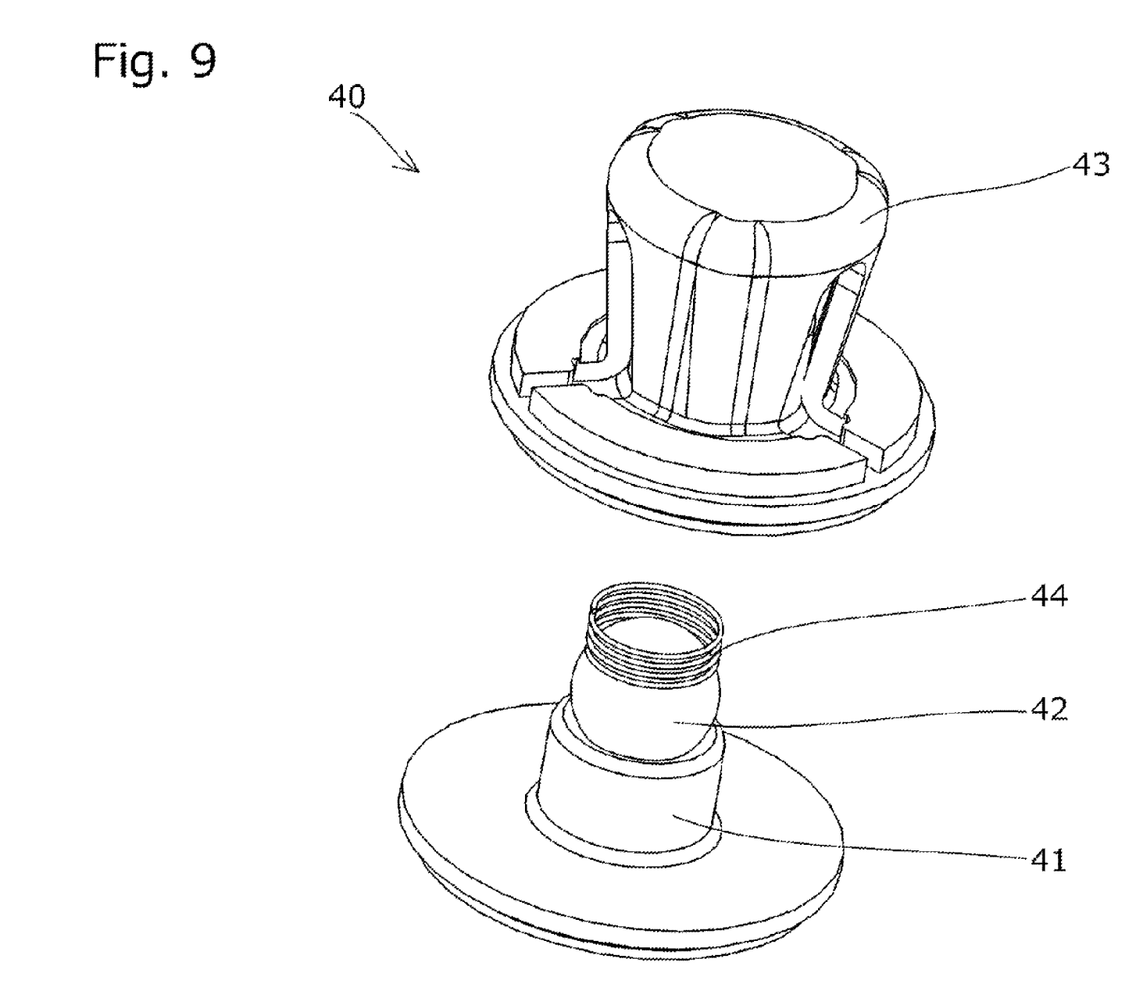
FIG. 9 is an exploded perspective view illustrating a check valve unit.

In the second embodiment, as shown in FIG. 8, at least a part of the check valve unit 40 (in this embodiment, the entire check valve unit 40) is accommodated in the tubular part 82 on the second side (rear side in this embodiment) of the second locking member 80, and in the hole (not shown) formed in the center of the second spring holder 81.

This way, the check valve unit 40 can also be handled with the spring 50, first stopper 70, and second stopper 80 as one unit.

The check valve unit 40 may be fixed to the second locking member 80. Alternatively, the check valve unit 40 may only be received in the second locking member 80 and not fixed to the second locking member 80.

While embodiments of the present invention have been described above in detail, the present invention is not limited to these embodiments and may be carried out with various design changes without departing from the scope of the present invention set forth in the claims. Various configurations of several embodiments and variations thereof described above may be freely combined to form other tensioners.

For example, while the tensioner was described as a component to be incorporated in a timing system of a car engine in the embodiments above, the purpose of use of the tensioner is not limited to this specific application.

Also, while the tensioner was described as a component that applies tension to a drive chain with a tensioner lever in the embodiments above, the plunger can directly guide the drive chain slidably with a distal end thereof to apply tension to the drive chain.

The tensioner may not necessarily be applied to a transmission mechanism with a drive chain but can also be used for similar transmission mechanisms that use belts, ropes and the like, and can be applied in a variety of industrial fields where it is required to apply tension to an elongated component.

While the housing accommodating the plunger is described as the component known as a tensioner body that is attached to an engine block or the like in the embodiments described above, the housing is not limited to the specific form described above and may be a cylindrical component known as a sleeve inserted into a body hole formed in the tensioner body.

While the first locking member and second locking member are described as being disposed on the front side and rear side, respectively, in the embodiments described above, the first locking member and second locking member may be disposed on the rear side and front side, respectively.

While the method of releasably engaging the first locking member and second locking member in the embodiments described above uses the restrained part of the first locking member and the movement restricting part and release cam of the second locking member, the method of releasably engaging the first locking member and second locking member is not limited to the one described above and any other methods can be employed.

While the first locking member is described as having a pin portion in the embodiments described above, the first locking member is not limited to the specific form described above. For example, the first locking member may have a tubular part extending from the first spring holder toward the second side, and this tubular part may be disposed radially inside or outside the tubular part of the second locking member.

While the restrained part of the first locking member and the movement restricting part (and release cam) of the second locking member are described as being disposed radially inside the spring in the embodiments described above, these restrained part and movement restricting part (and release cam) may be disposed radially outside the spring.

What is claimed is:

1. A tensioner comprising: a plunger having a plunger hole that is open on a rear side; a housing having a plunger accommodating hole that is open on a front side and accommodates the plunger; a spring accommodated inside an oil pressure chamber formed between the plunger and the plunger accommodating hole so as to be able to expand and contract and to urge the plunger toward the front side; and a locking mechanism stopping the plunger from projecting out toward the front side, the spring including a first end arranged on a first side in a front-to-back direction and a second end arranged on a second side in the front-to-back direction, the locking mechanism including a first locking member and a second locking member, the first locking member including a first spring holder arranged on the first side of the first end of the spring, and a restrained part, the second locking member including a second spring holder arranged on the second side of the second end of the spring, and a movement restricting part that restricts movement of the restrained part toward the first side, and the restrained part and the movement restricting part being configured to releasably engage with each other.

2. The tensioner according to claim 1, wherein the second locking member includes a release cam formed on the second side opposite the movement restricting part, and the release cam is formed so as to guide the restrained part in a circumferential direction to an open position where the restrained part is not locked by the movement restricting part, when the first locking member and the second locking member are moved closer to each other.

3. The tensioner according to claim 1, wherein the movement restricting part has a cam profile that guides the restrained part to a restriction position where movement of the restrained part is restricted by the movement restricting part, when the first locking member and the second locking member are moved away from each other.

4. The tensioner according to claim 1, wherein the restrained part and the movement restricting part are located radially inside the spring.

5. The tensioner according to claim 4, wherein
the first, locking member includes a pin portion extending from the first spring holder toward the second side and having the restrained part formed thereon,
the second locking member includes a tubular part extending from the second spring holder toward the first side and having the movement restricting part formed thereto, and
the pin portion is inserted in the tubular part.

6. The tensioner according to claim 5, wherein the restrained part is formed as a boss on an outer circumferential surface of the pin portion, and
the tubular part includes a passage slit extending from an edge on the first side of the tubular part toward the second side, and a movement restricting slit formed continuously with the passage slit,
an inner edge on the first side of the movement restricting slit functions as the movement restricting part, and
an inner edge on the second side of the movement restricting slit functions as a release cam.

7. The tensioner according to claim 5, wherein at least a part of a check valve unit that allows oil to flow into the oil pressure chamber and prevents oil from flowing out of the oil pressure chamber is accommodated in the tubular part on the second side thereof.

* * * * *